United States Patent

Baum et al.

[15] 3,652,275

[45] Mar. 28, 1972

[54] HEXAARYLBIIMIDAZOLE BIS (P-DIALKYL-AMINOPHENYL-α,β-UNSATURATED) KETONE COMPOSITIONS

[72] Inventors: Martin D. Baum; Cyrus P. Henry, Jr., both of Wilmington, Del.

[73] Assignee: E. I du Pont de Nemours and Company, Wilmington, Del.

[22] Filed: July 9, 1970

[21] Appl. No.: 53,686

[52] U.S. Cl. ........................................96/48, 96/90, 96/115, 204/159.14, 204/159.15, 204/159.16

[51] Int. Cl. ......................G03c 1/68, G03c 1/72, G03c 5/24

[58] Field of Search ........................................96/48, 90, 115; 204/159.14–159.16

[56] References Cited

UNITED STATES PATENTS

| | | | |
|---|---|---|---|
| 3,563,750 | 2/1971 | Walker | 96/90 |
| 3,563,751 | 2/1971 | Cohen | 96/90 |

*Primary Examiner*—Norman G. Torchin
*Assistant Examiner*—Richard E. Fichter
*Attorney*—John R. Powell

[57] ABSTRACT

Compositions comprising a hexaarylbiimidazole and a selected bis(p-aminophenyl-...α,β-unsaturated) ketone and optionally, a leuco dye, a polymerizable monomer or inert components such as binders, solvents and the like are photoactivated in the visible light wavelengths.

36 Claims, No Drawings

HEXAARYLBIIMIDAZOLE BIS (P-DIALKYL-AMINOPHENYL-$\alpha,\beta$-UNSATURATED) KETONE COMPOSITIONS

BACKGROUND OF THE INVENTION

1. Field of the Invention this invention relates to light-sensitive phototropic compositions and imaging systems. More specifically, this invention is directed to photodissociable hexaarylbiimidazoles in combination with a bis (p-aminophenyl-...$\alpha,\beta$-unsaturated) ketone sensitizer that absorbs in the visible light wavelengths.

2. Description of the Prior Art

Hexaarylbiimidazoles dissociate upon exposure to ultraviolet light to form stable colored triarylimidazolyl radicals useful as light screens as described in British Pat. No. 997,396, published July 7, 1965. Such dissociation is useful in hexarylbiimidazole/leuco dye compositions in that the triarylimidazolyl radical, formed as described above, oxidizes the leuco form of the dye to the colored form. Thus, colored images are obtained making the compositions useful in imaging applications, as described in U.S. Pat. No. 3,445,234.

The hexaarylbiimidazoles in general absorb largely and maximally at ultraviolet wavelength below 300 m$\mu$ and to some much lesser extent at wavelengths as high as 430 m$\mu$. Thus, while any of the compositions described above containing the hexaarylbiimidazole are sensitive to radiation over substantially the whole ultraviolet range, they respond most efficiently to radiation that corresponds to or substantially overlaps the region of maximum absorption. It is not always practical to irradiate fully into this region. For example, in some imaging applications, it is desired to cover the photosensitive hexaarylbiimidazole-leuco dye imaging composition with a transparent film. Some film materials, such as "Mylar" and "-Cronar" commercial polyesters, otherwise suitable, are not transparent below 300 m$\mu$, and thus prevent such short wavelength activating radiation from reaching the biimidazole, with consequent loss in efficiency.

Further, many commercially important ultraviolet sources, such as cathode ray tubes widely useful in imaging devices that convert electrical to light energy and transmit such light as images to photosensitive surfaces (plates, papers, films), emit mainly in the near ultraviolet and above, owing in part to limitations in the available phosphors and in part to the screening by the fiber optic face plate of radiation below 300 m$\mu$. Thus, imaging with such radiation sources is not entirely satisfactory as to the imaging speeds and optical densities that the hexaarylbiimidazole/leuco dye systems can inherently provide.

Thus, as the activating radiation contains increasing proportions of visible components or as components closer to the ultraviolet region are filtered out, hexaarylbiimidazole activation becomes less efficient as to the amount of energy utilized.

Chambers, U.S. Pat. No. 3.479,185, discloses photopolymerizable compositions containing a monomer, a free radical producing agent such as a leuco triphenylamine dye, and a hexaarylbiimidazole. Moreover, the photopolymerizable compositions of Chambers can optionally contain an energy-transfer dye such as Erythrosin (C.I. Acid Red 51), Rose Bengal (C.I. Acid Red 94), Eosin Y (C.I. Acid Red 87), or Phloxin B (C.I. Acid Red 92). These dyes extend the sensitivity of the three-component system into the visible spectral region and also increase the speed of polymerization. The resulting four-component system can initiate polymerization with exposure to visible light only, is stable, and does not lose sensitivity on aging. In the four-component system, the absorption of energy by the dye induces the same reaction from the lophine dimer combination as direct irradiation of the lophine dimer in the three-component system.

Copending application, Ser. No. 731,733, filed May 24, 1968, discloses photopolymerizable compositions containing hexaarylbiimidazoles and p-aminophenyl ketones such as Michler's ketone. The ketone sensitizers, as disclosed therein, extend the spectral sensitivity of the biimidazoles in the visible region of the spectrum.

The present invention enchances the efficiency of the hexaarylbiimidazole systems described above, especially the photopolymerizable compositions, in the visible light region of absorption through the use of selected bis(p-aminophenyl-...$\alpha,\beta$-unsaturated) ketone sensitizers. Moreover, the present invention provides improved sensitizers in the visible region.

SUMMARY OF THE INVENTION

This invention is directed to a photoactivatible composition comprising an admixture of A. a hexaarylbiimidazole that has its principal light absorption bands in the ultraviolet region of the electromagnetic radiation spectrum and is dissociable to triarylimidazolyl radicals on irradiation with such absorbable ultraviolet light, and B. a sensitizing amount of bis(p-aminophenyl-...$\alpha,\beta$-unsaturated) ketone of the formula (1)

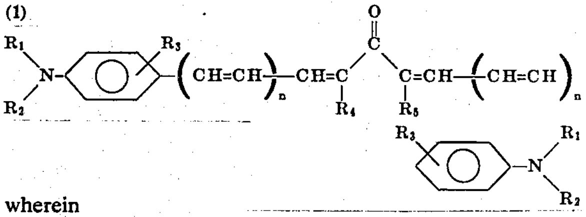

wherein $R_1$ is alkyl of one to four carbon atoms, or hydrogen;

$R_2$ is alkyl of one to four carbon atoms, or hydrogen;

$R_3$ is hydrogen, alkyl of one to four carbon atoms, chlorine or methoxy;

$R_4$ and $R_5$ are each hydrogen, alkyl of one to four carbon atoms or phenyl; with the proviso that $R_4$ and $R_5$ can be taken together and are $-CH_2-CH_2-$, $-CH_2-CH_2-CH_2-$, or $-CH_2-CH_2-CH_2-CH_2-$; and n is 0 or 1;

the ketone having its principal light absorption bands in the visible regions of the electromagnetic radiation spectrum, and, optionally C. a leuco dye that is oxidizable to dye by triarylimidazolyl radicals.

The invention is also directed to a photopolymerizable composition which comprises A and B, as defined above, and additionally, D. an addition-polymerizable, ethylenically unsaturated monomer, and optionally, E. a photooxidizable amine which may be component C above, and optionally, F. a chain transfer agent.

The invention is also directed to processes for irradiating the foregoing compositions.

DESCRIPTION OF THE INVENTION

This invention is based on the surprising discovery that an $\alpha,\beta$-unsaturated ketone as defined above, which absorbs light at longer wavelengths than the hexaarylbiimidazoles can transfer such absorbed long wavelength light energy to the hexarylbiimidazoles, i.e., the $\alpha,\beta$-unsaturated ketone can sensitize the hexaarylbiimidazole, thus converting it to the triarylimidazolyl radical. By thus extending the spectral sensitivity of the hexaarylbiimidazoles to wavelengths they do not normally absorb or absorb only weakly, the $\alpha,\beta$-unsaturated ketone significantly enhances their utility as light screens, photo oxidants and photopolymerization initiators.

While the sensitization mechanism is not known with certainty it is believed that when compositions of this invention are irradiated with long wavelength light, the $\alpha,\beta$-unsaturated ketone absorbs the light and is activated to at least one excited energy transfer state. In such activated state it transfers absorbed energy to the hexaarylbiimidiazole, for example through collision or resonance interaction and returns to the ground state, becoming available again for activation. The thus indirectly activated hexaarylbiimidazole dissociates into imidazolyl radicals.

The subsequent fate of the inherently colored and energy-rich imidazolyl radicals and their utilization in accordance with the various embodiments of this invention depends on the substantial absence or presence of other substances that are reactive towards the radicals. Thus in formulating light screens or windows containing hexaarylbiimidazole/α,-unsaturated ketone compositions, there will usually be employed components such as solvents and binders, as described by Cescon British Pat. No. 997,396, that are substantially inert, i.e., resistant, to oxidation by the imidazolyl radicals.

In such an embodiment the process manifests itself as a color change, attributable to formation of the inherently colored triarylimidazolyl radical (L·). When the light source is removed, the color fades as the radicals dimerize, thus regenerating hexaarylbiimidazole (LL), as follows:

$$2\,L\cdot \rightarrow LL \qquad (1)$$

The imidazolyl radicals are useful oxidants, as schematically illustrated in equation 2

$$2\,L\cdot + DH + H^+ \rightarrow 2\,LH + D^+ \qquad (2)$$

where DH for example is an oxidizable substance such as a leuco dye, $D^+$ is the oxidation product (dye), and LH is the reduction product (triarylimidazole).

Thus, the hexaarylbiimidazole/α,β-unsaturated ketone combinations are particularly useful as visible light actuated photooxidants for a variety of substrates, including leuco dyes, and the hexaarylbiimidazole/α, β-unsaturated ketone/leuco dye combinations constitute the basic ingredients of visible light actuated imaging systems, as more fully described below.

The hexaarylbiimidazole/α,β-unsaturated ketone compositions are also useful as photopolymerization initiators, particularly in combination with a photooxidizable amine as defined above.

The α,β-Unsaturated Ketone Sensitizer

The sensitizers useful in this invention are those broadly defined above. Preferred sensitizing ketones have the generic formula:

(2)

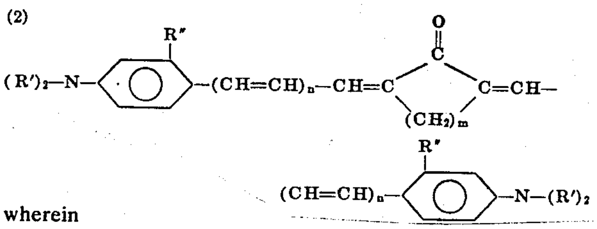

wherein $n = 0$, or 1, $m = 2$ or 3, $R' = CH_3$ or $C_2H_5$, $R'' = H$ or $CH_3$.

Preferably, the α,β-unsaturated ketone is one which absorbs substantially within the 300 to 600 mμ absorption range, 400 to 510 mμ being more preferred, and 430 to 505 mμ being particularly preferred. The α,β-unsaturated ketone's molar extinction coefficient (molar absorbency) at the wavelength chosen for sensitization is preferably greater than the hexaarylbiimidazole's and as high as practical, for example, at least 5,000 and preferably at least 10,000. The higher the extinction coefficient the better since there is more absorbed energy available for transfer to the hexaarylbiimidazole at the higher extinction coefficient levels.

the product of the extinction coefficient and the concentration) of the sensitizer is greater than the hexaarylbiimidazoles's at one or more wavelengths within the chosen exposure range. It will be appreciated that even though the hexaarylbiimdazole itself may absorb to some extent at such wavelengths, the effect of the α,β-unsaturated ketone sensitizer is to substantially and significantly increase the composition's total absorption of usable light during the exposure for the intended purpose. In general the actual quantity of α,β-unsaturated ketone sensitizer employed will range from about 0.001 to 1 mole per mole of hexaarylbimidazole, and preferably between about 0.01 and 0.5 mole per mole of hexaarylbiimidazole.

Particularly preferred sensitizers of formula (1) are the following:

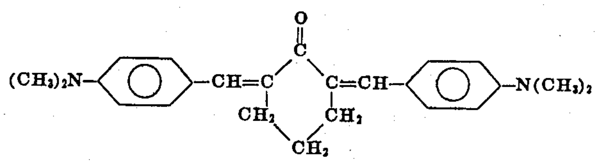

2,6-bis(4'-dimethylaminobenzylidene)cyclohexanone

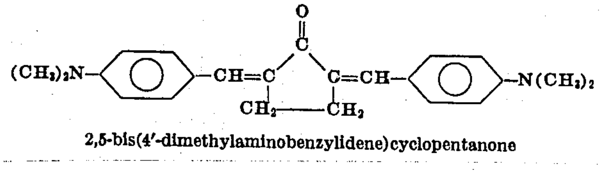

2,5-bis(4'-dimethylaminobenzylidene)cyclopentanone

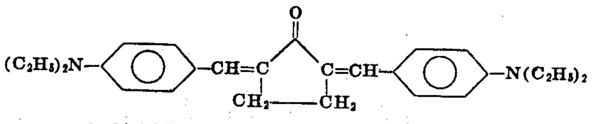

2,5-bis(4'-diethylaminobenzylidene)cyclopentanone

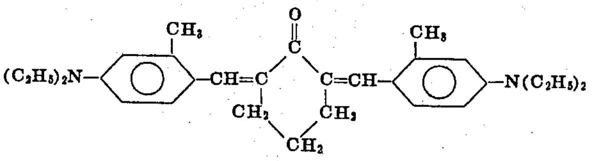

2,6-bis(4'diethylamino-2-methylbenzylidene)cyclohexanone

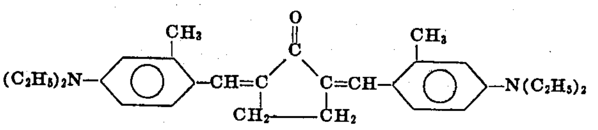

2,5-bis(4'-diethylamino-2'-methylbenzylidene)cyclopentanone

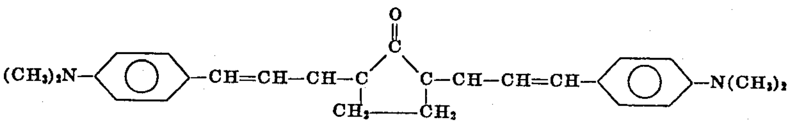

2,5-bis(4'-dimethylaminocinnamylidene)cyclopentanone

The quantity of the α,β-unsaturated ketone used in combination with the hexaarylbiimidazole will vary depending on its particular molar extinction coefficient, its efficiency in transferring the absorbed energy to the hexaarylbiimidazole, and the effect desired. Practically speaking, it will be present in normal sensitizing amounts. These amounts can be determined such that the optical density (directly proportional to As well as ketones of the formula

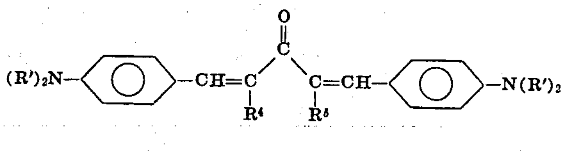

wherein R′, $R^4$ and $R^5$ are as defined above, such as 1,3-bis(4-dimethylaminobenzylidene)acetone.

The preparation of these sensitizing ketones involves an acid or base catalyzed bis condensation reaction of 2 moles of the appropriate dialkylaminobenzaldehyde or cinnamaldehyde with one mole of a ketone such as cyclopentanone, cyclohexanone, acetone, etc. Preferred compounds 1 and 2 are disclosed in "Chem. Zent", 1908′, p. 637–639; the other cycloalkanone derivatives are readily prepared by comparable syntheses. Michler's ketone vinylogs are disclosed in U.S. Pat. Nos. 3,257,202; 3,265,497; 2,860,983 and 2,860,984.

The Hexaarylbiimidazole

These are 2,2′,4,4,′,5,5′-hexaarylbiimidazoles, sometimes called 2,4,5-triarylimidazolyl dimers which are photodissociable to the corresponding triarylimidazolyl radicals. These hexaarylbiimidazoles absorb maximally in the 255–275 mμ region, and usually show some, though lesser absorption in the 300–375 mμ region. Although the absorption bands tend to tail out to include wavelengths as high as about 430 mμ, they normally require light rich in the 255–375 mμ wavelengths for their dissociation.

The hexaarylbiimidazoles can be represented by the formula

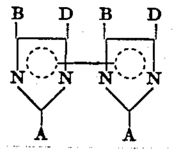

wherein A, B and D represent aryl groups which can be the same or different, carbocyclic or heterocyclic, unsubstituted or substituted with substituents that do not interfere with the dissociation of the hexaarylbiimidazole to the triarylimidazolyl radical or with the oxidation of the leuco dye, and each dotted circle stands for four delocalized electrons (i.e., two conjugated double bonds) which satisfy the valences of the carbon and nitrogen atoms of the imidazolyl ring. The B and D aryl groups can each be substituted with 0–3 substitutents and the A aryl groups can be substituted with 0–4 substitutents.

The aryl group include one- and two-ring aryls, such as phenyl, biphenyl, naphthyl, pyridyl, furyl and thienyl. Suitable inert (i.e., non-interfering with the processes described herein) substituents on the aryl groups have Hammett sigma (para) values in the −0.5 to 0.8 range, and are other than hydroxyl, sulfhydryl, amino, alkylamino or dialkylamino groups. Representative substituents and their sigma values, (relative to H = 0.00), as given by Jaffe, Chem. Rev. 53, 219–233 (1953) are: METHYL (−0.17), ethyl (−0.15), t-butyl (−0.20), phenyl (0.01), butoxy (−0.32), phenoxy (−0.03), fluoro (0.06), chloro (0.23), bromo (0.23), iodo (−0.28), methylthio (−0.05), nitro (0.78), ethoxycarbonyl (0.52), and cyano (0.63). The foregoing substituents are preferred; however, other substituents which can be employed include trifluoromethyl (0.55), chloromethyl (0.18), carboxyl (0.27), cyanomethyl (0.01), 2-carboxyethyl (−0.07), and methylsulfonyl (0.73). Thus, the substituents can be halogen, cyano, lower hydrocarbyl (including alkyl, halo alkyl, cyanoalkyl, hydroxyalkyl and aryl), lower alkoxy, aryloxy, lower alkylthio, arylthio, sulfo, alkyl sulfonyl, arylsulfonyl, and nitro, and lower alkylcarbonyl. In the foregoing list, alkyl groups referred to therein are preferably of one to six carbon atoms; while aryl groups referred to therein are preferably of six to 10 carbon atoms.

Preferably the aryl radicals are carbocyclic, particularly phenyl, and the substituents have Hammett sigma values in the range −0.4 to +0.4, particularly lower alkyl, lower alkoxy, chloro, fluoro, bromo and benzo groups.

In a preferred hexaarylbiimidazole class, the 2 and 2′aryl groups are phenyl rings bearing an ortho substituent having a Hammett sigma value in the range −0.4 to +0.4. Preferred ortho substituents are fluorine, chlorine, bromine, methyl and methoxy groups, especially chloro. Such biimidazoles tend less than others to form color when the light-sensitive compositions are applied to and dried on substrates at somewhat elevated temperatures, e.g., in the range 70°–100° C.

Most preferably, the 2-phenyl ring carries only the above-described ortho group, and the 4- and 5-phenyl rings are either unsubstituted or substituted with lower alkoxy.

Preferred hexaarylbiimidazoles include 2,2′-bis(o-chlorophenyl)-4,4′,5,5′-tetraphenylbiimidazole and 2,2′-bis(o-chlorophenyl)-4,4′,5,5′-tetrakis(m-methoxyphenyl)biimidazole.

Representative hexaarylbiimidazoles which can be employed in this invention include:

2,2′-bis(o-bromophenyl)-4,4′,5,5′-tetraphenylbiimidazole,
2,2′-bis(p-bromophenyl)-4,4′,5,5′-tetraphenylbiimidazole,
2,2′-bis(p-carboxyphenyl)-4,4′,5,5′-tetraphenylbiimidazole,
2,2′-bis(o-chlorophenyl)-4,4′,5,5′-tetrakis(p-methoxyphenyl)-biimidazole,
2,2′-bis(o-chlorophenyl)-4,4′,5,5′-tetraphenylbiimidazole,
2,2′-bis(p-chlorophenyl)-4,4′,5,5′-tetrakis(p-methoxyphenyl)-biimidazole,
2,2′-bis(p-cyanophenyl)-4,4′,5,5′-tetrakis(p-methoxyphenyl)-biimidazole,
2,2′-bis(2,4-dichlorophenyl)-4,4′,5,5′-tetraphenylbiimidazole
2,2′-bis(2,4-dimethoxyphenyl)-4,4′,5,5′-tetraphenylbiimidazole
2,2′-bis(o-ethoxyphenyl)-4,4′,5,5′-tetraphenylbiimidazole,
2,2′-bis(m-fluorophenyl)-4,4′,5,5′-tetraphenylbiimidazole,
2,2′-bis(o-fluorophenyl)-4,4′,5,5′-tetraphenylbiimidazole,
2,2′-bis(p-fluorophenyl)-4,4′,5,5′-tetraphenylbiimidazole,
2,2′-bis(o-n-hexyloxyphenyl)-4,4′,5,5′-tetraphenylbiimidazole,
2,2′-bis(o-n-hexylphenyl)-4,4′,5,5′-tetrakis(p-methoxyphenyl)-biimidazole,
2,2′-bis(3,4-methylenedioxyphenyl)-4,4′,5,5′-tetraphenylbiimidazole,
2,2′-bis(o-chlorophenyl)-4,4′,5,5′-tetrakis(m-methoxyphenyl) biimidazole,
2,2′-bis(o-chlorophenyl)-4,4′,5,5′-tetrakis[m-(betaphenoxy-ethoxyphenyl)]biimidazole,
2,2′-bis(2,6-dichlorophenyl)-4,4′,5,5′-tetraphenylbiimidazole,
2,2′-bis(o-methoxyphenyl)-4,4′,5,5′-tetraphenylbiimidazole,
2,2′-bis(p-methoxyphenyl)-4,4′-bis(o-methoxyphenyl)-5,5′-diphenylbiimidazole,
2,2′-bis(o-nitrophenyl)-4,4′,5,5′-tetraphenylbiimidazole,
2,2′-bis(p-phenylsulfonylphenyl)-4,4′,5,5′-tetraphenylbiimidazole,
2,2′-bis(p-sulfamoylphenyl)-4,4′,5,5′-tetraphenylbiimidazole,
2,2′-bis(2,4,6-trimethylphenyl)-4,4′,5,5′-tetraphenylbiimidazole,
2,2′-di-4-biphenylyl-4,4′,5,5′-tetraphenylbiimidazole,
2,2′-di-1-naphthyl-4,4′,5,5′-tetrakis(p-methoxyphenyl)-biimidazole,
2,2-di-9-phenanthryl-4,4′,5,5′-tetrakis(p-methoxyphenyl)-biimidazole,
2,2′-diphenyl-4,4′,5,5′-tetra-4-biphenylylbiimidazole,
2,2′-diphenyl-4,4′,5,5′-tetra-2,4-xylylbiimidazole, 2,2′-di-3-pyridyl-4,4′,5,5′-tetraphenylbiimidazole,
2,2′-di-3-thienyl-4,4′,5,5′-tetraphenylbiimidazole,
2,2′-di-o-tolyl-4,4′,5,5′-tetraphenylbiimidazole,
2,2′-di-p-tolyl-4,4′-di-o-tolyl-5,5′-diphenylbiimidazole,
2,2′-di-2,4-xylyl-4,4′,5,5′-tetraphenylbiimidazole,
2,2′,4,4′,5,5′-hexakis(p-benzylthiophenyl)biimidazole,
2,2′,4,4′,5,5′-hexa-1-naphthylbiimidazole,
2,2′,4,4′,5,5′-hexaphenylbiimidazole,
2,2′-bis(2-nitro-5-methoxyphenyl)-4,4′,5,5′-tetraphenylbiimidazole, and 2,2'-bis(o-nitrophenyl)-4,4',5,5'-tetrakis(m-methoxyphenylbiimidazole.

2,2'-bis(2-chloro-5-sulfophenyl)-4,4',5,5'-tetraphenylbiimidazole.

The hexaarylbiimidazoles are conveniently obtained by known methods as more particularly described by British Pat. No. 997,396 and by Hayashi et al., Bull.Chem.Soc.Japan, 33, 565 (1960) and Cescon & Dessauer U.S. Pat. No. 3,445,234. The preferred method, involving oxidative dimerization of the corresponding triarylimidazole with ferricyanide in alkali, generally yields the 1-2'-hexaarylbiimidazoles, although other isomers, such as the 1,1; 1,4';2,2';2,4'; and 4,4'-hexaarylbiimidazoles are sometimes also obtained admixed with the 1,2'-isomer. For the purposes of this invention, it is immaterial which isomer is employed so long as it is photodissociable to the triarylimidazolyl radical, as discussed above.

The Optional Leuco Dye

A leuco dye together with the hexaarylbiimidazole and the $\alpha,\beta$-unsaturated ketone forms one embodiment of this invention. By the term "leuco dye" is meant the colorless (i.e., the reduced) form of a dye compound which can be oxidized to its colored form by the triarylimidazolyl radical.

Leuco dyes which can be oxidized to color by the triarylimidazolyl radicals generated from the compositions of this invention include: aminotriarylmethanes, aminoxanthenes, aminothioxanthenes, amino-9,10-dihydroacridines, aminophenoxazines, aminophenothiazines, aminodihydrophenazines, aminodiphenylmethanes, leuco indamines, aminohydrocinnamic acids (cyanoethanes, leuco methines), hydrazines, leuco indigoid dyes, amino-2,3-dihydroanthraquinones, tetrahalo-p,p'-biphenols, 2(p-hydroxyphenyl)-4,5-diphenylimidazoles, phenethylanilines, and the like. These classes of leuco dyes are described in greater in detail in Cescon and Dessauer U.S. Pat. No. 3,445,234; Cescon, Dessauer and Looney U.S. Pat. No. 3,423,427; Cescon, Dessauer and Looney U.S. Pat. No. 3,449,379; Read U.S. Pat. No. 3,395,018 and Read U.S. Pat. No. 3,390,997.

The preferred leucos are the aminotriarylmethanes. Preferably the aminotriarylmethane is one wherein at least two of the aryl groups are phenyl groups having (a) an $R_1R_2N$-substituent in the position para to the bond to the methane carbon atom wherein $R_1$ and $R_2$ are each groups selected from hydrogen, $C_1$ to $C_{10}$ alkyl, 2-hydroxyethyl, 2-cyanoethyl, benzyl or phenyl, and (b) a group ortho to the bond to the methane carbon atom which is selected from lower alkyl, lower alkoxy, fluorine, chlorine, bromine, or butadienylene which when joined to the phenyl group forms a naphthalene ring; and the third aryl group, when different from the first two, is selected from thienyl, furyl, oxazolyl, pyridyl, thiazolyl, indolyl, indolinyl, benzoxazolyl, quinolyl, benzothiazolyl, phenyl, naphthyl, or such aforelisted groups substituted with lower alkyl, lower alkoxyl, methylenedioxy, fluoro, chloro, bromo, amino, lower alkylamino, lower dialkylamino, lower alkylthio, hydroxy, carboxy, carbonamido, lower carbalkoxy, lower alkylsulfonyl, lower alkylsulfonamido, $C_6$ to $C_{10}$ arylsulfonamido, nitro or benzylthio. Preferably the third aryl group is the same as the first two.

Particularly preferred aminotriarylmethanes have the following structural formula:

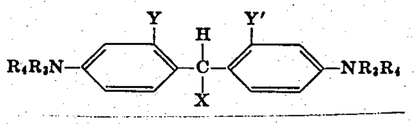

WHEREIN $R_3$ and $R_4$ are selected from lower alkyl (preferably ethyl) or benzyl, Y and Y' are lower alkyl (preferably methyl) and X is selected from

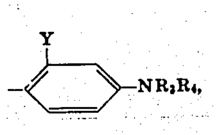

p-methoxyphenyl, 2-thienyl, phenyl, 1-naphthyl, 2,3-dimethoxyphenyl, 3,4-methylene-dioxyphenyl, or p-benzylthiophenyl. Preferably X is selected from

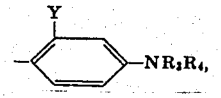

phenyl, 1-naphthyl, or p-benzylthiophenyl.

These triarylmethanes are employed as salts of strong acids: for example, mineral acids such as hydrochloric, hydrobromic, sulfuric, nitric, phosphoric; organic acids such as acetic, oxalic, p-toluenesulfonic, trichloroacetic acid, trifluoroacetic acid, perfluoroheptanoic acid; and Lewis acids such as zinc chloride, zinc bromide, and ferric chloride; the proportion of acid usually varying from 0.33 mole to 1 mole per amino group. The term "strong acid" as used herein is defined as an acid which forms a salt with an anilino amino group.

Specific examples of the aminotriarylmethanes employed in this invention are:

bis(4-amino-2-butylphenyl)(p-dimethylaminophenyl)methane
bis(4-amino-2-chlorophenyl)(p-aminophenyl)methane
bis(4-amino-3-chlorophenyl)(o-chlorophenyl)methane
bis(4-amino-3-chlorophenyl)phenylmethane
bis(4-amino-3,5-diethylphenyl)(o-chlorophenyl)methane
bis(4-amino-3,5-diethylphenyl)(o-ethoxyphenyl)methane
bis(4-amino-3,5-diethylphenyl)(p-methoxyphenyl)methane
bis(4-amino-3,5-diethylphenyl)phenylmethane
bis(4-amino-3-ethylphenyl)(o-chlorophenyl)methane
bis(p-aminophenyl)(4-amino-m-tolyl)methane
bis(p-aminophenyl)(o-chlorophenyl)methane
bis(p-aminophenyl)(p-chlorophenyl)methane
bis(p-aminophenyl)(2,4-dichlorophenyl)methane
bis(p-aminophenyl)(2,5-dichlorophenyl)methane
bis(p-aminophenyl)(2,6-dichlorophenyl)methane
bis(p-aminophenyl)phenylmethane
bis(4-amino-o-tolyl)(p-chlorophenyl)methane
bis(4-amino-o-tolyl)(2,4-dichlorophenyl)methane
bis(p-anilinophenyl)(4-amino-m-tolyl)methane
bis(4-benzylamino-2-cyanophenyl)(p-aminophenyl)methane
bis(p-benzylethylaminophenyl)(p-chlorophenyl)methane
bis(p-benzylethylaminophenyl)(p-diethylaminophenyl)methane
bis(p-benzylethylaminophenyl)(p-dimethylaminophenyl)methane
bis(4-benzylethylamino-o-tolyl)(p-methoxyphenyl)methane
bis(p-benzylethylaminophenyl)-phenylmethane bis(4-benzylethylamino-o-tolyl)(o-chlorophenyl)methane
bis(4-benzylethylamino-o-tolyl)(p-diethylaminophenyl)methane
bis(4-benzylethylamino-o-tolyl)(4-diethylamino-o-tolyl)methane
bis(4-benzylethylamino-o-tolyl)(p-dimethylaminophenyl)methane
bis[2-chloro-4-(2-diethylaminoethyl)ethylaminophenyl](o-chlorophenyl)methane
bis[p-bis(2cyanoethyl)aminophenyl]phenylmethane
bis[p-(2-cyanoethyl)ethylamino-o-tolyl](p-dimethylaminophenyl)methane
bis[p-(2-cyanoethyl)methylaminophenyl](p-diethylaminophenyl)methane
bis(p-dibutylaminophenyl)[p-(2-cyanoethyl)methylaminophenyl]methane
bis(p-dibutylaminophenyl)(p-diethylaminophenyl)methane
bis(4-diethylamino-2-butoxyphenyl)(p-diethylaminophneyl)methane
bis(4-diethylamino-2-fluorophenyl)o-tolylmethane
bis(p-diethylaminophenyl)(p-aminophenyl)methane
bis(p-diethylaminophenyl)(4-anilino-1-naphthyl)methane
bis(p-diethylaminophenyl)(m-butoxyphenyl)methane bis(p-diethylaminophenyl)(o-chlorophenyl)methane
bis(p-diethylaminophenyl)(p-cyanophenyl)methane
bis(p-diethylaminophenyl)(2,4-dichlorophenyl)methane
bis(p-diethylaminophenyl)(4-diethylamino-1-naphthyl)methane
bis(p-diethylaminophenyl)(p-dimethylaminophenyl)methane
bis(p-diethylaminophenyl)(4-ethylamino-1naphthyl)methane
bis(p-diethylaminophenyl)2-naphthylmethane
bis(p-diethylaminophenyl)(p-nitrophenyl)methane
bis(p-diethylaminophenyl)2-pyridylmethane
bis(p-diethylamino-m-tolyl)(p-diethylaminophenyl)methane
bis(4-diethylamino-o-tolyl)(o-chlorophenyl)methane
bis(4-diethylamino-o-tolyl)(p-diethylaminophenyl)methane
bis(4-diethylamino-o-tolyl)(p-diphenylaminophenyl)methane
bis(4-diethylamino-o-tolyl)phenylmethane
bis(4-dimethylamino-2-bromophenyl)phenylmethane
bis(p-dimethylaminophenyl)(4-anilino-1-naphthyl)methane
bis(p-dimethylaminophenyl)(p-butylaminophenyl)methane
bis(p-dimethylaminophenyl)(p-sec. butylethylaminophenyl)methane
bis(p-dimethylaminophenyl)(p-chlorophenyl)methane
bis(p-dimethylaminophenyl)(p-diethylaminophenyl)methane
bis(p-diemthylaminophenyl)(4-dimethylamino-1-naphthyl)methane
bis(p-dimethylaminophenyl)(6-diemthylamino-m-tolyl)methane
bis(p-dimethylaminophenyl)(4-dimethylamino-o-tolyl)methane
bis(p-dimethylaminophenyl)(4-ethylamino-1-naphthyl)methane
bis(p-dimethylaminophenyl)(p-hexyloxyphenyl)methane
bis(p-dimethylaminophenyl)(p-methoxyphenyl)methane
bis(p-diemthylaminophenyl)(5-methyl-2-pyridyl)methane
bis(p-dimethylaminophenyl)2-quinolylmethane
bis(p-dimethylaminophenyl) o-tolylmethane
bis(p-diemthylaminophenyl)(1,3,3-trimethyl-2-indolinylidenemethyl)methane
bis(4-dimethylamino-o-tolyl)(p-aminophenyl)methane
bis(4-dimethylamino-o-tolyl)(o-bromophenyl)methane
bis(4-dimethylamino-o-tolyl)(o-cyanophenyl)methane
bis(4-dimethylamino-o-tolyl)(o-fluorophenyl)methane
bis(4-dimethylamino-o-tolyl)1-naphthylmethane
bis(4-dimethylamino-o-tolyl)phenylmethane
bis(p-ethylaminophenyl)(o-chlorophenyl)methane
bis(4-ethylamino-m-tolyl)(o-methoxyphenyl)methane
bis(4-ethylamino-m-tolyl)(p-methoxyphenyl)methane
bis(4-ethylamino-m-tolyl)(p-dimethylaminophenyl)methane
bis(4-ethylamino-m-tolyl)(p-hydroxyphenyl)methane
bis[4-ethyl(2-hydroxyethyl)amino-m-tolyl](p-diethylaminophenyl)methane
bis[p-(2-hydroxyethyl)aminophenyl](o-chlorophenyl)methane
bis[p-(bis(2-hydroxyethyl)aminophenyl](4-diethylamino-o-tolyl)methane
bis[p-(2-methoxyethyl)aminophenyl]phenylmethane
bis(p-methylaminophenyl)(o-hydroxyphenyl)methane
bis(p-propylaminophenyl)(m-bromophenyl)methane
tris(4-amino-o-tolyl(methane
tris(4-anilino-o-tolyl)methane
tris(p-benzylaminophenyl)methane
tris[4-bis(2-cyanoethyl)amino-o-tolyl]methane
tris[p-(2-cyanoethyl)ethylaminophenyl]methane
tris(p-dibutylaminophenyl)methane
tris(p-di-n-butylaminophenyl)methane
tris(4-diethylamino-2-chlorophenyl)methane
tris(p-diethylaminophenyl)methane
tris(4-diethylamino-o-tolyl)methane
tris(p-dihexylamino-o-tolyl)methane
tris(4-dimethylamino-o-tolyl)methane
tris(p-hexylaminophenyl)methane
tris[p-bis(2-hydroxyethyl)aminophenyl]methane
tris(p-methylaminophenyl)methane
tris(p-dioctadecylaminophenyl)methane
tris(4-diethylamino-2-fluorophenyl)methane
tris(4-dimethylamino-2-fluorophenyl)methane
bis(2-bromo-4-diethylaminophenyl)phenylmethane,
bis(2-butoxy-4-diethylaminophenyl)phenylmethane,
bis(4-diethylamino-o-tolyl)(p-methoxyphenyl)methane,
bis(4-diethylamino-2-methoxyphenyl)(p-nitrophenyl)methane,
bis(4-diethylamino-1-naphthyl)(4-diethylamino-o-tolyl)methane,
bis(4-diethylamino-o-tolyl)1-naphthylmethane,
bis(4-diethylamino-o-tolyl)phenylmethane,
tris(4-dimethylamino-2-chlorophenyl)methane,
bis(4-dimethylamino-2,5-dimethylphenyl)phenylmethane,
bis(4-dimethylamino-o-tolyl)(o-bromophenyl)methane,
bis(4-ethylbenzylamino-o-tolyl)(p-methoxyphenyl)methane,
tris(p-dioctylamino-o-tolyl)methane,
bis(4-diethylamino-o-tolyl)(4-methoxy-1-naphthyl)methane
bis(4-diethylamino-o-tolyl)(3,4,5-trimethoxyphenyl)methane
bis(4-diethylamino-o-tolyl)(p-hydroxyphenyl)methane
5-[bis(4-diethylamino-o-tolyl)methyl]-2,3-cresotic acid
4-[bis(4-diethylamino-o-tolyl)-methyl]-phenol
4-[bis(4-diethylamino-o-tolyl)-methyl]-acetanilide
4-[bis(4-diethylamino-o-tolyl)-methyl]-phenylacetate
4-[bis(4-diethylamino-o-tolyl)-methyl]-benzoic acid
4-[bis(4-diethylamino-o-tolyl)-methyl]-diphenyl sulfone
4-[bis(4-diethylamino-o-tolyl)-methyl]-phenylmethyl sulfone
4-[bis(4-diethylamino-o-tolyl)-methyl]-methylsulfonanilide
4-[bis(4-diethylamino-o-tolyl)-methyl]-p-tolylsulfonanilide
bis(4-diethylamino-o-tolyl)(p-nitrophenyl)methane
bis(4-diethylamino-o-tolyl)(2-diethylamino-4-methyl-5-thiazolyl)methane
bis(4-diethylamino-o-tolyl)(2-diethylamino-5-methyl-6-benzoxazolyl)methane
bis(4-diethylamino-o-tolyl)(2-diethylamino-5-methyl-6-benzothiazolyl)methane
bis(4-diethylamino-o-tolyl)(1-ethyl-2-methyl-3-indolyl)-methane
bis(4-diethyalmino-o-tolyl)(1-benzyl-2-methyl-3-indolyl)methane
bis(4-diethylamino-o-tolyl)(1-ethyl-2-methyl-5-methoxyl-3-indolyl)methane
bis(1-o-xylyl-2-methyl-3-indolyl)(4-diethylamino-o-tolyl)methane
bis(4-diethylamino-o-tolyl)(1ethyl5-indolinyl)methane
bis(1-isobutyl-6-methyl-5-indolinyl)(4-diethylamino-o-tolyl)methane
bis(4-diethylamino-o-tolyl)(8-methyl-9-julolindinyl)methane
bis(4-diethylamino-2-acetamidophenyl)(4-diethylamino-o-tolyl)methane
4-[bis(4-diethylamino-o-tolyl)methyl]-N-ethylacetanilide
bis[4-(1-phenyl-2,3-dimethyl-5-pyrazolinyl)](4-diethylamino-o-tolyl)methane
bis(4-diethylamino-o-tolyl)(7-diethylamino-4-methyl-3-coumarinyl)methane
bis(4-diethylamino-o-tolyl)4-acrylamidophenyl)methane
bis(4-diethylamino-o-tolyl)(p-benzylthiophenyl)methane
bis(4-diethylamino-o-tolyl)(4-isopropylthio-3-methylphenyl)methane
bis(4-diethylamino-o-tolyl)(4-chlorobenzylthiophenyl)methane
bis(4-diethylamino-o-tolyl)(2-furyl)methane
bis(4-diethylamino-o-tolyl)(3,4-methylenedioxyphenyl)methane
bis(4-diethylamino-o-tolyl)(3,4-dimethoxyphenyl)methane bis(4-diethylamino-o-tolyl)(3-methyl-2-thienyl)methane
bis(4-diethylamino-o-tolyl)(2,4-dimethoxyphenyl)methane
bis[4-(2-cyanoethyl)(2-hydroxyethyl)amino-o-tolyl]-(p-benzylthiophenyl)methane,
bis[4-(2-cyanoethyl)(2-hydroxyethyl)amino-o-tolyl]-2-thienylmethane,
bis(4-dibutylamino-o-tolyl)2-thienylmethane,
bis(4-diethylamino-2-ethylphenyl)(3,4-methylenedioxyphenyl)methane,
bis(4-diethylamino-2-fluorophenyl)(p-benzylthiophenyl)methane,
bis(4-diethylamino-2-fluorophenyl)(3,4-methylenedioxyphenyl)methane,
bis(4-diethylamino-o-tolyl)(p-methylthiophenyl)methane,
bis(4-diethylamino-o-tolyl)2-thienylmethane,
bis(4-dimethylamino-2-hexylphenyl)(p-butylthiophenyl)methane,
bis[4-(N-ethylanilino)-o-tolyl](3,4-dibutoxyphenyl)methane,
bis[4-bis(2-hydroxyethyl)amino-2-fluorophenyl](p-benzylthio-phenyl)methane,
bis(4-diethylamino-o-tolyl)(p-chlorophenyl)methane,
bis(4-diethylamino-o-tolyl)(p-bromophenyl)methane,
bis(4-diethylamino-o-tolyl)(p-fluorophenyl)methane,
bis(4-diethylamino-o-tolyl)(p-tolyl)methane,
bis(4-diethylamino-o-tolyl)(4-methoxy-1-naphthyl)methane,
bis(4-diethylamino-o-tolyl)(3,4,5-trimethoxyphenyl)methane,
bis(4-diethylamino-o-tolyl)(p-hydroxyphenyl)methane,
bis(4-diethylamino-o-tolyl)(3-methylthienyl)methane.

Preparation of Compositions and Other Components

The hexaarylbiimidazole and $\alpha,\beta$-unsaturated ketone sensitizer are conveniently carried in an inert common solvent in proportions recited above and in amounts providing at least about 0.5% by weight of the hexaarylbiimidazole. To provide color-forming or imaging compositions, one or more leuco dyes as defined above are added, usually in amounts providing from 0.1 to 10 moles of leuco dye per mole of hexaarylbiimidazole, more usually from 0.5 to 2 moles and preferably about 1 mole, per mole of hexaarylbiimidazole. Still other components may be present as described further below.

Solvents

In general, solvents are employed which are volatile at ordinary pressures. Examples are amides such as N,N-dimethylformamide and N,N-dimethylacetamide; alcohols and ether alcohols such as methanol, ethanol, 1-propanol, 2-propanol, butanol, and ethylene glycol; esters such as methyl acetate and ethyl acetate; aromatics such as benzene, o-dichlorobenzene, toluene; ketones such as acetone, methyl ethyl ketone, 3-pentanone; aliphatic halocarbons such as methylene chloride, chloroform, 1,1,2-trichloroethane, 1,1,2,2-tetrachloroethane, 1,1,2-trichloroethylene; miscellaneous solvents such as dimethylsulfoxide, pyridine, tetrahydrofuran, dioxane, dicyanocyclobutane, 1-methyl-2-oxohexamethyleneimine; and mixtures of these solvents in various proportions as may be required to attain solutions.

In imaging uses such solvents provide a fluid medium for convenient application of the light-sensitive composition to substrates. To obtain the final coated article the solvent is normally removed as, e.g., by evaporation. It is often beneficial to leave a small residue of solvent in the dried composition so that the desired degree of imaging can be obtained upon subsequent irradiation. Ordinary drying such as that employed in paper manufacture or in film casting results in the retention of ample solvent to give a composition with good photosensitivity. The compositions so produced are dry to the touch and stable to storage at room temperature. Indeed, moisture of the air is absorbed by many of the compositions, particularly those comprising an acid salt of an amino leuco form of a dye on cellulosic substrates, and serves as a suitable solvent.

Binders

Polymeric binders can also be present in the light-sensitive compositions to thicken them or adhere them to substrates. Binders can also serve as a matrix for the color-forming composition and the mixture can be cast, extruded or otherwise formed into unsupported imageable films. Light-transparent and film-forming polymers are preferred. Examples are ethyl cellulose, polyvinyl alcohol, polyvinyl chloride, polystyrene, polyvinyl acetate, poly(methyl methacrylate), cellulose acetate, cellulose butyrate, cellulose acetate butyrate, cellulose nitrate, chlorinated rubber, co-polymers of the above vinyl monomers, and gelatin. Binder or matrix amounts vary from about 0.5 part to about 200 parts by weight per part of combined weight of leuco dye and hexaarylbiimidazole. In general, from 0.5 to 10 parts are used as adhesive or thickener, while higher amounts are used to form the unsupported films. With certain polymers, it may be desirable to add a plasticizer to give flexibility to the film or coating. Plasticizers include the polyethylene glycols such as the commercially available carbowaxes, and related materials, such as substituted phenol-ethylene oxide adducts, for example the polyethers obtained from o-, m- and p-cresol, o-, m- and p-phenylphenol and p-nonylphenol, including commercially available materials such as the Igepal alkyl phenoxy polyoxyethylene ethanols. Other plasticizers are the acetates, propionates, butyrates and other carboxylate esters of ethylene glycol, diethyleneglycol, glycerol, pentaerythritol and other polyhydric alcohols, and the alkyl phthalates and phosphates such as dimethyl phthalate, diethyl phthalate, dioctyl phthalate, tributyl phosphate, trihexyl phosphate, trioctyl phosphate, triphenyl phosphate, tricresyl phosphate and cresyl diphenyl phosphate.

Photopolymerizable Compositions

Another embodiment of this invention is a photopolymerizable composition comprising the hexaarylbiimidazole/$\alpha,\beta$-unsaturated ketone sensitizer combination as defined above and an addition-polymerizable ethylenically unsaturated compound. Such composition can include one or more other ingredients such as a carrier solvent or a binder as described above, or a polymerization aid such as an electron-donating free radical generator as disclosed in Belgian Pat. No. 681,944.

The addition-polymerizable component includes low and high-molecular-weight compounds, including polymeric compounds which have at least one polymerizable ethylenic group, preferably a terminal $CH_2=C$ group, free to polymerize. Thus this component can be a relatively simple monomer or it may be a polymer having cross-linkable ethylenic groups. Normally its molecular weight is below about 1,500 and it contains two or more ethylenic, particularly vinylic groups, for crosslinking. Preferred monomers are the terminally unsaturated carboxylic ester monomers, particular alpha-methylene carboxylic acid esters of polyols, e.g., ethylene glycol diacrylate, diethylene glycol diacrylate, triethylene glycol diacrylate, glycerol diacrylate, glycerol triacrylate, ethylene glycol dimethacrylate, 1,2-propanediol dimethacrylate, 1,2,4-butanetriol trimethacrylate, 1,4-cyclohexanediol diacrylate, 1,4-benzenediol dimethacrylate, pentaerythritol tetramethacrylate, 1,3-propanediol diacrylate, 1,5-pentanediol dimethacrylate, pentaerythritol triacrylate; the bisacrylates and methacrylates of polyethylene glycols of molecular weight 100–500, and the like.

The addition-polymerizable component will ordinarily be present in an amount of 10 to 100 moles/mole of hexaarylbiimidazole, and more usually, 15 to 25 moles/mole. With these latter proportions, a plasticizer, usually 10–50 percent by weight based on weight of monomer, can be employed.

Preferred photopolymerizable compositions of this invention also include as polymerization aid or co-initiator a photooxidizable amine such as triethanolamine, N-phenyl glycine, N,N-diethylaniline, N,N-dimethylglycine tri-n-hexylamine, dimethyl cyclohexylamine, diethylcyclohexylamine, N,N,N',N'-tetramethylethylene diamine, tetramethylethylene diamine, 2-dimethylaminoethanol, 3-dimethylamino-1-propanol, 2-diethanolamine or any aminotriarylmethane leuco dye, particularly those containing dialkylamino groups, described above as useful herein as color generators, in an amount described for the leuco dye.

With an aminotriarylmethane leuco dye present in a color-forming amount, the photopolymerizable compositions are capable of forming color as well as polymer on being irradiated according to the method of the invention. The polymerization rate can often be speeded up by employing another free radical generator or chain transfer agent, in amount ranging from 0.01 to 0.1 mole/mole leuco dye, such as N-phenylglycine, 1,1-dimethyl-3,5-diketocyclohexane, or organic thiols, e.g., 2-mercaptobenzothiazole, 2-mercaptobenzoxazole, 2-mercaptobenzimidazole, pentaerythritol tetrakis(mercaptoacetate), 4-acetamidothiophenol, mercaptosuccinic acid, dodecanethiol, beta-mercaptoethanol, or other organic thiol.

Through exposure control, e.g., by altering the intensity and time of exposure, as more fully described in Cescon, Cohen & Dessauer, Ser. No. 740,103, filed June 26, 1968 and assigned to the assignee herein, the color-forming and polymerization reactions can be controlled so as to produce substantially colored or uncolored compositions. Thus polymerization fixed images can be produced in imaging applications by sequentially applied exposures that substantially completely polymerize the composition while controlling the amount of color produced in adjacent areas.

Substrates

For imaging uses, the compositions of this invention can be coated upon or impregnated in substrates following known techniques. Substrates include materials commonly used in the graphic arts and in decorative applications such as paper ranging from tissue paper to heavy cardboard, films of plastics and polymeric materials such as regenerated cellulose, cellulose acetate, cellulose nitrate, polyester of glycol and terephthalic acid, vinyl polymers and co-polymers, polyethylene, polyvinylacetate, polymethyl methacrylate, polyvinylchloride; textile fabrics; glass; wood; and metals. The composition, usually as a solution in a carrier solvent described above, can be sprayed, brushed, applied by a roller or an immersion coater, flowed over the surface, picked up by immersion or spread by other means, and the solvent evaporated.

Light Sources

Any convenient source providing wavelengths in the region of the spectrum that overlap the $\alpha,\beta$-unsaturated ketone sensitizer s absorption bands can be used to activate the light-sensitive compositions for triarylimidazolyl radical formation, image formation, and photopolymerization initiation. The light can be natural or artificial, monochromatic or polychromatic, incoherent or coherent, and for high efficiency should correspond closely in wavelengths to the $\alpha,\beta$-unsaturated ketone sensitizer's principal absorption bands and should be sufficiently intense to activate a substantial proportion of the sensitizer. Also, it may often be advantageous to increase the speed of triarylimidazolyl radical and image formation by employing the longer wavelength light range in accord with this invention in conjunction with the ultraviolet light range normally required to dissociate the dimer.

Conventional light sources include fluorescent lamps, mercury, metal additive and arc lamps providing narrow or broad light bands centered near 420, 450 and 500 mμ wavelengths. Coherent light sources are the pulsed nitrogen-, argon ion- and ionized neon-lasers whose emissions fall within or overlap the visible absorption bands of the sensitizer.

Ultraviolet and visible emitting cathode ray tubes widely useful in printout systems for writing on photosensitive materials are also useful with the subject compositions. These in general involve an ultraviolet or visible-emitting phosphor internal coating as the means for converting electrical energy to light energy and a fiber optic face plate as the means for directing the radiation to the photosensitive target. Representative phosphors that emit strongly, and substantially overlap the visible absorption characteristics of the subject compositions, include the P4B (emitting at 300–550 mμ, peaking at 410 mμ)and P22B (390–510 mμ, peaking at 450 mμ) types. Other phosphors which may be used are the P11 (400–560 mμ, peaking at 460 mμ) and $ZrP_2O_7$ types. (The Electronic Industries Association, New York, New York, assigns P-numbers and provides characterizing information on the phosphors; phosphors with the same P-number have substantially identical characteristics.)

Images can be formed by writing with a beam of the activating light or by exposing to such light a selected area behind a negative, stencil, or other relatively opaque pattern. The negative can be silver on cellulose acetate or polyester film or one in which its opacity results from aggregations of areas having different refractive indices. Image formation can also be effected in conventional diazo printing apparatus, or in a thermography device, provided the instrument emits some of its light in the desired wavelength range. A piece of onionskin paper which bears typewriting, for example, can serve as a master from which copies are made. The light exposure time may vary from a fraction of a second to several minutes, depending upon the intensity and spectral energy distribution of the light, its distance from the composition, the nature and amount of the composition available, and the intensity of color in the image desired.

The following examples illustrate various embodiments of this invention in greater detail:

EXAMPLE 1

The ketone sensitizers were prepared by known methods. Dicondensation was easily accomplished in 2B denatured alcohol using sodium hydroxide catalysis, generally with a short reflux period. A high-melting product precipitated in 50–95% yield upon cooling; filtration followed by a 2B alcohol wash yielded a product of sufficient purity to use directly in further reactions. The compounds structures were verified by NMR spectra, supplemented by elemental analyses in some instances. Spectral properties of these compounds were quite unusual. The vinyl protons are at extremely low field, admixed with the aromatic signal in the NMR. The IR spectra (solution or mull) showed the carbonyl absorption at about 6.15 microns, superimposed on the aromatic and vinyl absorption. The ultraviolet and visible absorption spectra are shown in Table I. Double bond configuration is not shown; a mixture is suspected. The ketone compounds have the following structure.

(I)

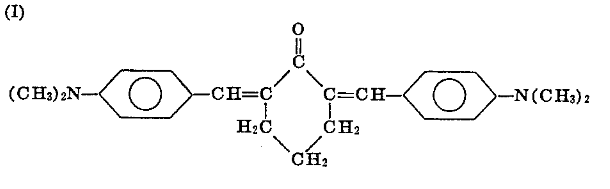

(II)

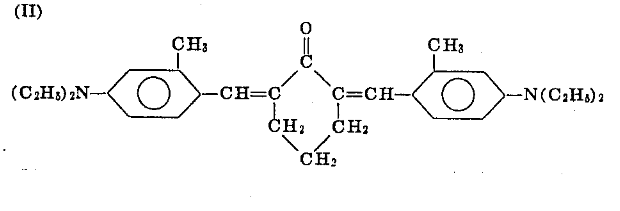

(III)

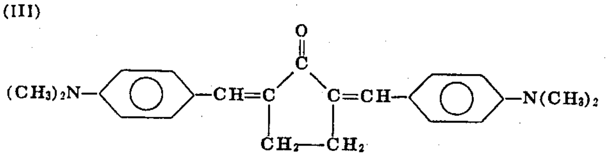

(IV)

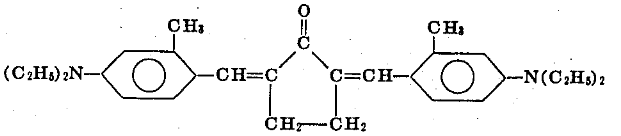

(V)

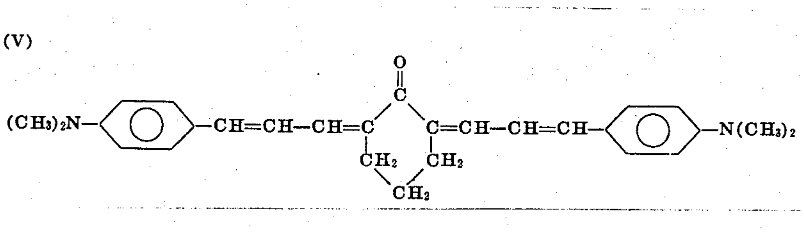

(VI)

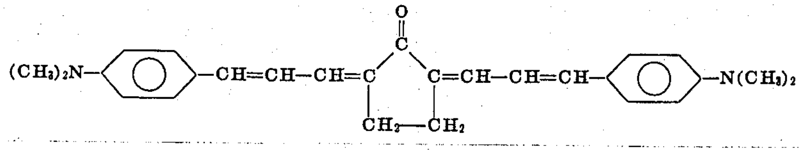

(VII)

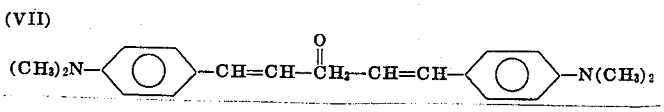

TABLE I

Ultraviolet and Visible Absorption Spectra of Alkanone Condensation Products in Chloroform

| Sensitizer | λmax, mμ | Extinction Coefficient |
|---|---|---|
| I | 310 | 13,200 |
| | 434 | 19,500 |
| II | 284 | 22,800 |
| | 447 | 28,300 |
| III | 275 | 14,900 |
| | 317 | 7,700 |
| | 446 | 53,500 |
| IV | 272 | 17,600 |
| | 314 | 4,200 |
| | 326 | 4,300 |
| | 430 | 33,600 |
| | 455 | 34,400 |
| V | 318 | 17,000 |
| | 480 | 51,100 |
| VI | 315 | 18,600 |
| | 505 | 64,000 |
| VII | 263 | 14,800 |
| | 330 | 6,300 |
| | 442 | 41,300 |
| VIII | 280 | 18,500 |
| | 480 | 64,000 |

Preparation of 2,6-Bis(4′-dimethylaminobenzylidene cyclohexanone (I)

A solution of 10.0 grams (0.102 mole) of cyclohexanone, 30.4 grams (0.204 mole) of 4-dimethylaminobenzaldehyde, and 25 milliliters of 25% aqueous sodium hydroxide in 500 milliliters of 2B alcohol was refluxed 3 hours, then cooled in an ice bath. The resultant orange-red crystals were filtered off and washed with 2B alcohol. The melting point of the product was 248°–251° C. and the yield was 24 grams (59%). The NMR, IR, and UV analysis agreed with the proposed product. Anal. Calcd. for $C_{24}H_{28}N_2O$: C, 79.86; H, 7.83; N, 7.77. Found: C, 78.89; H, 7.53; N, 7.92.

Preparation of 2,6-Bis(2′-methyl-4′-diethylaminobenzylidene-cyclohexanone (II)

One hundred and six and six-tenths grams of crude, filtered 2-methyl-4-dimethylaminobenzaldehyde was condensed with 29 grams (0.296 mole) of cyclohexanone in the same manner as for I above to obtain 65 grams (51.5%) of orange crystals, m.p. 181°–182.5°. NMR, IR, and UV analysis agreed with the proposed product.

Preparation of 2,5-Bis(4′-dimethylaminobenzylidene)cyclopentanone (III)

Dicondensation of 56 grams (0.38 mole) of 4-dimethylaminobenzaldehyde with 16.5 grams (0.2 mole) of cyclopentanone in the same manner as for I above led to 63 grams (95%) of orange crystals, m.p. 300°–303°. MRS, IR, and UV analysis agreed with the proposed product.

Preparation of 2,5-Bis(2′-methyl-4′-diethylaminobenzylidene)cyclopentanone (IV)

Two hundred and four grams of crude, filtered 2-methyl-4-diethylaminobenzaldehyde and 35 grams (0.417 mole) of cyclopentanone were condensed in the manner described above to obtain 161 grams (95%) of deep red crystals, m.p. 167°–170°. NMR and IR analysis agreed with the proposed product.

Dicondensation Product of 4-Dimethylaminocinnamaldehyde and Cyclohexanone (V)

Condensation of 5.3 grams of 4-dimethylaminocinnamaldehyde with 1.5 grams of cyclohexanone in the manner described for I above gave 4.5 grams (70%) of deep red-magenta crystals, m.p. 2580°–61°, and after recrystallization from alcohol/chloroform, m.p. 260–3°, with acceptable IR, UV and NMR characteristics.

Dicondensation Product of 4-Dimethylaminocinnamaldehyde with Cyclopentanone (VI)

Synthesis by the procedure of V above gave a 93% yield of very deep maroon crystals, m.p. 258°–64° C., with acceptable IR, UV and NMR spectra.

Preparation of 1,3-Bis(4-Dimethylaminobenzylidine)acetone (VII)

Attempts to run this reaction at reflux temperature of alcohol led to untractable tars. But when 5.8 grams of acetone (0.10 mole) and 29.84 grams (0.20 mole) of 4-dimethylaminobenzaldehyde were stirred for 7 hours at room temperature under nitrogen, then cooled to ice temperature, filtration gave orange crystals, 6.4 grams (19%), m.p. 181°–190° (dec.) after washing with 2B alcohol and drying.

In a like manner, the ethyl homolog of ketone III was obtained, m.p. 187–189.5, having the following structure:

(VIII)

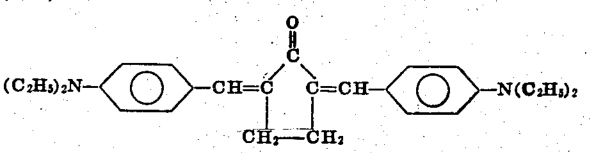

EXAMPLE 2

Photopolymerization

Formulations were prepared from the following ingredients:

TABLE II

| Formulation | A | B | C | D | E | F | G | H |
|---|---|---|---|---|---|---|---|---|
| Acetone (ml.) | 80 | 80 | 80 | 80 | 80 | 80 | 80 | 80 |
| Cellulose acetate butyrate (grams) (Eastman Chemicals EAB-381-20) | 10 | 10 | 10 | 10 | 10 | 10 | 10 | 10 |
| Triethyleneglycol dimethacrylate (ml.) | 10 | 10 | 10 | 10 | 10 | 10 | 10 | 10 |
| Ketone IV (grams) | 0.050 | 0.050 | 0.050 | 0.050 | | | | 0.050 |
| 2-Mercaptobenzoxazole (grams) | | 0.010 | 0.010 | 0.010 | 0.010 | 0.010 | 0.010 | |
| 2,2′-(o-chlorophenyl-4,4′-5,5′-tetrakis (m-methoxyphenyl) biimidazole (grams) | | | 0.300 | | | 0.300 | | 0.300 |
| 2,2′-bis (o-chlorophenyl)-4,4′,5,5′-tetraphenylbiimidazole (grams) | | | | 0.300 | | | 0.300 | |

The formulations were coated on 3 mil "Melinex" X503 polyester film, warmed slightly to evaporate the acetone, and laminated with 0.5 mil (50S) "Mylar" polyester film. Polymerization was determined by dusting with pigments that do not adhere to polymerized areas of the delaminated film.

a. Films prepared from formulations C, D, F and G were exposed to light of intensity 1.5 mw/cm.² from a mercury-vapor lamp; two Corning filters 7-54 and one 0-52 filter were used to give 40 mμ bands of incident light centered near 366 μ. Under these conditions, formulation F was fully photopolymerized in 8 seconds, formulation G in 16 seconds, illustrating that hexaarylbiimidazole of F is approximately 2 times faster than that of G.

Formulation C exhibited full photopolymerization in 8 seconds, D in 16 seconds. Thus, at near UV wavelengths (366 mμ), ketone IV has no effect on the polymerization speeds which were the same as G and F.

b. Repeating (a), but with light of intensity 10.0 mw/cm.² (mercury-vapor lamp) with a wavelength range of about 40 mμ centered near 430 mμ, resulting from the use of one Corning 7-59 and one 3-74 filter, gave entirely different results. Under these conditions, formulation D exhibited a photopolymerization rate (16 sec.) about four times that of G (64 sec.). Similarly, the ketone sensitized formulation C is about three times faster than the unsensitized formulation F. These data illustrate the efficacy of ketone IV in photopolymerization.

c. Repeating (b), including film formulation B, but with light of intensity 25.0 mw/cm.² and at wavelength greater than 430 mμ, resulting from the use of one Corning 3-72 filter and one I-69 filter, gave still different results. Under these conditions, formulations F and G (no sensitizer) showed no photopolymerization even after 4-minute exposures. Formulations C and D, on the other hand, exhibited photopolymerization rates as shown in 2*a*, namely 8 and 16 seconds, respectively. Under these long wavelength irradiation conditions, there is, apparently, no absorption of the biimidazole, hence no photodissociation or photo-induced polymerization. The presence of ketone IV, on the other hand, provides a photopolymerization rate equal to irradiation with near ultraviolet light (a).

The results obtained with formulation B (no biimidazole) are informative. Film formulation B exhibited photopolymerization, but only after about 32 sec. exposure. Thus, ketone IV and 2-mercaptobenzoxazole can initiate photopolymerization, but at rates 2–4 times slower than when a biimidazole is present.

d. Film formulations A, E, and H were irradiated as in (c) above. Formulations A and E showed no photopolymerization with exposures up to 4 minutes. These results indicate that the ketone sensitizer along (formulation A) is ineffective for initiating photopolymerization, and that the chain transfer agent along (formulation E) is equally ineffective.

Formulation H exhibited no photopolymerization on exposure for 2 minutes, slight polymerization when irradiated 4 minutes. This results shows that photopolymerization can occur in the absence of a chain transfer agent, but that photopolymerization can occur in the absence of a chain transfer agent, but that photopolymerization is markedly improved when a chain transfer agent is present.

EXAMPLE 3–8

Photopolymerization

"Mylar" (1mil thick) polyester film was coated to a wet thickness of 6 mil using an acetone solution of cellulose acetate butyrate (13.2 grams), triethyleneglycol dimethacrylate (12.5 milliliters), 2,2′-bis(o-chlorophenyl)-4,4′,5,5′-tetrakis-(m-methoxyphenyl)biimidazole (3.0 grams), 2-mercaptobenzoxazole (0.10 grams) and various amounts of Michler's ketone (MK), p,p-bis(dimethylamino)benzophenone, and/or ketone sensitizers of this invention, and laminated as in Example 2. The films were irradiated at two different wavelengths, obtained by the use of suitable filters. Irradiation with light at about 366 mμ, incident intensity of 1.00 mw/cm.², was obtained using two Corning 7-54 filters and one 0-52 filter. Irradiation at 430 mμ, incident intensity of 10.0 mw/cm.², was obtained using one Corning 7-59 and one 3-74 filter. The irradiation time required to give complete photopolymerization at the two wavelengths is shown in Table III.

TABLE III

| Example number | Additive | $I_i$=10.0 mw./cm.[2] ~430 mJ (7–59, 3–74) Time (sec.) | $I_i$=1.00 mw./cm.[2] ~366 mμ (7–54(2), 0–52) Time (sec.) |
|---|---|---|---|
| 3 | None (control) | 8 | 2 |
| 4 | 0.5 g. Michler's ketone (MK) | 5 | 1 |
| 5 | 1.5 g. MK | 4 | 1 |
| 6 | 50 mg. ketone sensitizer VIII | 2 | 2 |
| 7 | 72 mg. ketone sensitizer VIII, and 100 mg. MK | 2 | 1 |
| 8 | 50 mg. ketone sensitizer II | 3 | 2 |

The Examples are informative. It is obvious that when irradiating in the near UV (Example 3, ≈366 mμ), photopolymerization is rapid. Further, addition of Michler's ketone essentially doubles the rate of photopolymerization, while ketone sensitizers II and VIII afford no improvement over the control.

Irradiation in the visible (≈430 mμ), however, presents quite a different picture. Firstly, the control (no additive) is four times slower at ≈430 mμ. vs. ≈366 mμ. Secondly, the addition of Michler's ketone, in relatively large amounts, increases the photopolymerization rate by about 2 times. Ketone sensitizers VIII and II, however, are more efficient than Michler's ketone at increasing rate of photopolymerization, and required relatively small quantities of sensitizer to achieve this improvement. Clearly, the ketone sensitizers of this invention are more beneficial at visible wavelengths. Indeed, with ketone sensitizer II, the photopolymerization rate at ≈430 mμ is equal to unsensitized photopolymerization in the near ultraviolet, ≈366 mμ.

EXAMPLE 9

Formulations were prepared based on the following components:

| | |
|---|---|
| Acetone | 77 ml. |
| Cellulose Acetate Butyrate | 10.0 g. |
| Ethylene oxide adduct of p-cresol, average formula $CH_3—C_6H_4—O(CH_2CH_2O)_{1.5}H$ | 4.3 g. |
| 2,2'-Bis(o-chlorophenyl)-4,4',5,5'-tetrakis(m-methoxyphenyl) biimidazole | 1.248 g. |
| Tris(4-diethylamino-o-tolyl)methane | 0.422 g. |
| p-Toluenesulfonic Acid | 0.435 g. |

Both the above unsensitized formulation and two others to which were added 0.062 g. of sensitizer II and 0.056 g. of sensitizer VIII (equal molar amounts) were coated to a 10 mil wet thickness on Mylar polyester film, followed by drying under an IR lamp to evaporate the acetone.

These three films were exposed to a 1,000 watt type 4081 Mole-Richardson lamp through a water filter and through one Corning 3-71 filter, one Corning 4-71 filter, and one Corning 1-69 filter. The optical densities, as measured with a Macbeth Quantalog transmission densitometer, obtained from these films at different intensities after a 60 second exposure, are as follows:

| Film | Incident Intensity 5 mw./cm.[2] | 15 mw./cm.[2] | 26 mw./cm.[2] |
|---|---|---|---|
| Unsensitized Control | — | 0.06 | 0.06 |
| Control with Sensitizer II | 0.23 | 0.39 | 0.53 |
| Control with Sensitizer VIII | 0.25 | 0.41 | 0.49 |

It is obvious that color formation via reaction of hexaarylbiimidazole, aminotriarylmethane, and p-toluenesulfonic acid did not occur at wavelengths longer than 460 mμ (3-71 filter cut-off) unless either sensitizer II or VIII was added. Removal of the hexaarylbiimidazole from such films showed that no color formation occurred via reaction of aminotriarylmethane p-toluenesulfonic acid, and the sensitizers.

A similar experiment showed that sensitizers III, IV, V, and VI will sensitizer a hexaarylbiimidazole, aminotriarylmethane, p-toluenesulfonic acid color formation.

EXAMPLE 10

Formulations were prepared based on the following components:

| | | |
|---|---|---|
| Acetone | 100 | ml. |
| Cellulose acetate butyrate | 10 | g. |
| Triethyleneglycol dimethacrylate | 10 | ml. |
| 2,2'-bis(o-chlorophenyl)-4,4',5,5'-tetrakis(m-methoxyphenyl) biimidazole | 1.40 | g. |
| 2,2'-bis(o-chlorophenyl)-4,4',5,5'-tetraphenylbiimidazole | 0.70 | g. |
| 2-mercaptobenzoxazole | 0.050 | g. |
| Michler's ketone | 0.20 | g. |

Film A - Above formulation

Film B - Above formulation plus 0.020 g. of sensitizer IV

Film C - Formation A plus 0.020 g. of Sensitizer VII

The formulations were coated on 3 mil polyester film, dried; and then laminated with a 1.42 mil polyester film. Exposure of films A, B, and C to light of 1.0 mw/cm.[2] intensity from a mercury-vapor lamp resulted in all three films being completely polymerized with the same one second exposure. The light was of broad wavelength centered near 366 mμ via use of two Corning 7-54 and one 0-52 filters.

However, exposure of films A, B and C to light of 10.0 mw/cm.[2] intensity but centered near 430 mμ wavelength via use of one Corning 7-59 and one 3-74 filter showed that both films B and C with sensitizers IV and VII gave complete polymerization with 1/4 the exposure time required for the unsensitized film, A. Under these conditions sensitizer VII was as effective as sensitizer IV and it had less background color.

EXAMPLE 11

Sensitization of photopolymerization to decrease color formation is shown in the following example. A film formed from the following formulation (A) is compared to a sensitized film (B) of the same composition but containing addition of 0.020 g. of sensitizer IV:

| | | |
|---|---|---|
| Acetone | 40 | ml. |
| Cellulose acetate butyrate | 3.96 | g. |
| Triethyleneglycol dimethacrylate | 3.72 | ml. |
| 2,2'-bis (o-chlorophenyl)-4,4',5,5'-tetrakis(m-methoxyphenyl) biimidazole | 0.471 | g. |
| 2,2'-bis(o-Chlorophenyl)4,4',5,5'-tetraphenylbiimidazole | 0.471 | g. |
| Bis(4-diethylamino-o-tolyl)-(p-benzylthiophenyl)methane | 0.564 | g. |
| p-Toluenesulfonic acid | 0.375 | g. |
| 2-mercaptobenzoxa zole | 0.014 | g. |
| Michler's ketone | 0.040 | g. |

These formulations were coated on 3 mil polyester film, dried, and laminated with a 0.5 mil polyester film.

Exposure of these sensitized and unsensitized films 8 inches from a Westinghouse photoflood bulb No. 1 gave the following optical densities, measured as in Example 9, after color formation of the films using high intensity flash lamp exposures. Both films contain Michler's ketone which increases photopolymerization in the near UV but has little effect above 430 m$\mu$.

| | Exposure time (sec.) | | | | No Filter | | |
|---|---|---|---|---|---|---|---|
| | 120 | 60 | 32 | 16 | 8 | 4 | 0 |
| Film A (O.D.) | 0.35 | 0.36 | 0.45 | 0.62 | 0.89 | 1.19 | 1.20 |
| Film B (O.D.) | 0.34 | 0.37 | 0.47 | 0.63 | 0.82 | 1.15 | 1.21 |

| | Exposure time (sec.) | | | 3-72 Corning Filter | | | |
|---|---|---|---|---|---|---|---|
| | 120 | 60 | 32 | 16 | 8 | 4 | |
| Film A (O.D.) | 1.30 | 1.31 | 1.31 | 1.32 | 1.29 | 1.29 | 1.26 |
| Film B (O.D.) | 0.36 | 0.43 | 0.59 | 0.73 | 0.94 | 1.18 | 1.20 |

The sensitized film and unsensitized film showed similar behavior when UV light was absorbed by the film but above 430 m$\mu$ (3-72 filter cut-off) only the film with sensitizer IV gave evidence of photopolymerization and the subsequent loss in ability to form color with high intensity exposure, as described in Cescon et al., U.S. application Ser. No. 740,103 filed June 26, 1968.

EXAMPLE 12

Four portions of the following solution were prepared:

SOLUTION A

| | |
|---|---|
| Acetone | 15 ml. |
| Cellulose Acetate Butyrate | 1.32 g. |
| Triethyleneglycol dimethacrylate (60 p.p.m. hydroquinone) | 1.32 g. |
| p-toluenesulfonic Acid·$H_2O$ | 0.125 g. |
| 2,2'-Bis(o-chlorophenyl)-4,4',5,5'-tetrakis(m-methoxyphenyl) biimidazole | 0.315 g. |
| Bis(4-diethylamino-o-tolyl)(p-benzylthiophenyl)methane | 0.188 g. |

The following components were added to Solution A.

| Component | Formulation 1 | 2 | 3 | 4 |
|---|---|---|---|---|
| Solution A | 1 portion | 1 portion | 1 portion | 1 portion |
| Sensitizer III | 0 | 0.005 g. | 0 | 0.005 g. |
| N-phenylglycine | 0.005 g. | 0.005 g. | 0 | 0 |
| Solution B | 0 | 0 | 1 ml. | 1 ml. |

Solution B comprised 0.15 g. of 1,1-dimethyl-3,5-diketocyclohexanene in 10 ml. of methanol. Formulations 1–4 were applied to 3 mil Mylar polyester film at a wet thickness of 5 mil and dried with a heat lamp. The dried films were laminated with a cover sheet of 1 mil Mylar polyester film. The films at a temperature of 75° C., were exposed to a XBO150W1 xenon arc lamp through a Corning 3-72 filter. This filter passes light of wavelengths greater than 430 m$\mu$. The irradiance at the film plane was 12.5 mw/cm$^2$. After this exposure the films were exposed to a single flash from a xenon flashtube (Model K, Hico Corporation, Watertown, Mass.) and the resulting optical densities measured with a Macbeth Quantalog transmission densitometer.

The exposure time required to reduce the color forming capability of each film by 0.3 O.D. units was measured and is reported in Table I.

TABLE I

Comparison of Sensitized and Unsensitized Films

| Formulation | Time |
|---|---|
| 1 | 34 sec. |
| 2 | 8.6 sec. |
| 3 | 180 sec. |
| 4 | 12 sec. |

This experiment shows the visible light fixing speed improvement obtained by adding a sensitizer of this invention.

The embodiments of the invention in which an exclusive property or privilege is claimed are defined as follows:

1. A photoactivatible composition comprising an admixture of

A. a hexaarylbiimidazole that has its principal light absorption bands in the ultraviolet region of the electromagnetic radiation spectrum and is dissociable to triarylimidazolyl radicals on irradiation with absorbable ultraviolet light and B. a sensitizing amount of ketone of the formula

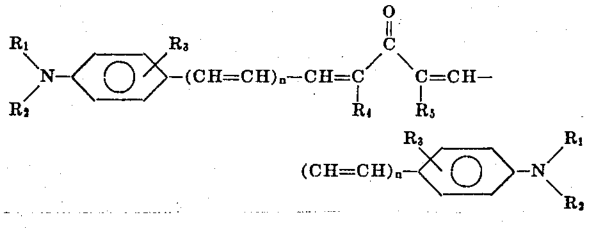

wherein $R_1$ is alkyl of one to four carbon atoms, or hydrogen;

$R_2$ is alkyl of one to four carbon atoms, or hydrogen;

$R_3$ is hydrogen, alkyl of one to four carbon atoms, chlorine or methoxy $R_4$ is hydrogen, alkyl of one to four carbon atoms or phenyl;

$R_5$ is hydrogen, alkyl of one to four carbon atoms or phenyl, with the proviso that $R_4$ and $R_5$ can be taken together and are $—CH_2—CH_2—$, $—CH_2—CH_2—CH_2—$ or $—CH_2—CH_2—CH_2—CH_2—$; and n is 0 or 1;

the ketone having its principal light absorption bands in the visible regions of the electromagnetic radiation spectrum.

2. The composition of claim 1 wherein the hexaarylbiimidazole absorbs maximally in the 255–275 m$\mu$ region of the electromagnetic radiation spectrum, and the ketone absorbs substantially in the 300–600 m$\mu$ region of the electromagnetic radiation spectrum.

3. The composition of claim 2 wherein the hexaarylbiimidazole is a 2,2',4,4',5,5'-hexaphenylbiimidazole in which the phenyl groups can contain non-interfering substituents which have Hammett sigma values in the −0.5 to 0.8 range, and the ketone is one of the formula

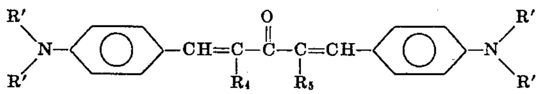

wherein

R' is methyl or ethyl;

$R_4$ is hydrogen, alkyl of one to four carbon atoms or phenyl; and $R_5$ is hydrogen, alkyl of one to four carbon atoms or phenyl, with the proviso that $R_4$ and $R_5$ can be taken together and are $—CH_2—CH_2—$ or $—CH_2—CH_2—CH_2—$.

4. The composition of claim 2 wherein the hexaarylbiimidazole is a 2,2',4,4',5,5'-hexaphenylbiimidazole in which the phenyl groups can contain non-interfering substituents which have Hammett sigma values in the −0.5 to 0.8 range, and the ketone is one of the formula

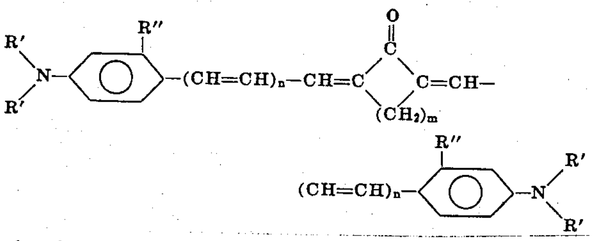

wherein

R' is methyl or ethyl;

R'' is hydrogen or methyl;

n is 0 to 1; and m is 2 or 3.

5. The composition of claim 4 wherein the phenyl groups of the 2,2',4,4',5,5'-hexaphenylbiimidazole can contain substituents selected from among lower alkyl, lower alkoxy, chloro, fluoro, bromo and benzo, and
the ketone is selected from among 2,6-bis(4'-diethylamino-2-methylbenzylidene)cyclohexanone 2,6-bis(4'-dimethylaminobenzylidene)cyclohexanone, 2,5-bis(4'-dimethylaminobenzylidene)cyclopentanone, 2,5-bis(4'-diethylaminobenzylidene)cyclopentanone, 2,5-bis(4'-diethylamino-2'-methylbenzylidene)cyclopentanone, and 2,5-bis(4'-dimethylaminocinnamylidene)cyclopentanone.

6. The composition of claim 5 wherein the hexaarylbiimidazole is 2,2'-bis(l-chlorophenyl)-4,4',5,5'-tetraphenylbiimidazole or 2,2'-bis(o-chlorophenyl)-4,4',5,5'-tetrakis-(m-methoxyphenyl)biimidazole.

7. The composition of claim 2 containing, additionally,

C. a leuco dye that is oxidizable to dye by triarylimidazolyl radicals.

8. The composition of claim 3 containing, additionally,

C. a leuco dye that is oxidizable to dye by triarylimidazolyl radicals which is selected from aminotriarylmethanes, aminoxanthanes, aminothioxanthenes, amino-9,10-dihydroacridines, aminophenoxazines, aminophenothiazines, aminodihydrophenazines, aminodiphenylmethanes, leuco indamines, aminohydrocinnamic acids, hydrazines, leuco indigoid dyes, amino-2,3-dihydroanthraquinones, tetrahalo-p,p'-biphenols, 2(p-hydroxyphenyl)-4,5-diphenylimidazoles, or phenethylanilines.

9. The composition of claim 4 containing, additionally,

C. a leuco dye that is oxidizable to dye by triarylimidazolyl radicals which is selected from aminotriarylmethanes, aminoxanthanes, aminothioxanthenes, amino-9,10-dihydroacridines, aminophenoxazines, aminophenothiazines, aminodihydrophenazines, aminodiphenylmethanes, leuco indamines, aminohydrocinnamic acids, hydrazines, leuco indigoid dyes, amino-2,3-dihydroanthraquinones, tetrahalo-p,p'-biphenols, 2(p-hydroxyphenyl)-4,5-diphenylimidazoles, or phenethylanilines.

10. The composition of claim 5 containing, additionally,

C. a strong acid salt of an aminotriarylmethane leuco dye wherein at least two of the aryl groups are phenyl groups having (a) an $R_1R_2N$-substituent in the position para to the bond to the methane carbon wherein $R_1$ and $R_2$ are each selected from the class consisting of hydrogen, $C_1$ to $C_{10}$ alkyl, 2-hydroxyethyl, 2-cyanoethyl, benzyl or phenyl, and (b) a group ortho to the bond to the methane carbon atom which is selected from lower alkyl, lower alkoxy, fluorine, chlorine, bromine, or butadienylene which when joined to the phenyl group forms a naphthalene ring; and the third aryl group, when different from the first two, is selected from thienyl, furyl, oxazolyl, pyridyl, thiazolyl, indolyl, indolynyl, benzoxazolyl, quinolyl, benzothiazolyl, phenyl, naphthyl, or such aforelisted groups substituted with lower alkyl, lower alkoxyl, methylenedioxy, fluoro, chloro, bromo, amino, lower alkylamino, lower dialkylamino, lower alkylthio, hydroxy, carboxy, carbonamido, lower carbalkoxy, lower alkylsulfonyl, lower alkylsulfonamido, $C_6$ to $C_{10}$ arylsulfonamido, nitro or benzylthio.

11. The composition of claim 6 containing, additionally, a leuco dye selected from the p-toluenesulfonic acid salt of tris (p-N,N-diethylamino-o-tolyl)methane, or bis(4-diethylamino-o-tolyl)-(p-benzylthiophenyl)methane.

12. The composition of claim 2 which contains, additionally, an addition-polymerizable, ethylenically unsaturated compound, a photooxidizable amine and, optionally, a chain transfer agent.

13. The composition of claim 3 which contains, additionally, an addition-polymerizable, ethylenically unsaturated compound selected from terminally unsaturated carboxylic ester monomers, a photooxidizable amine, and optionally, a chain transfer agent selected from N-phenylglycine, 1,1-dimethyl-3,5-diketocyclohexane or an organic thiol.

14. The composition of claim 4 which contains, additionally, an addition-polymerizable, ethylenically unsaturated compound selected from terminally unsaturated carboxylic ester monomers, a photooxidizable amine, and optionally, a chain transfer agent selected from N-phenylglycine, 1,1-dimethyl-3,5-diketocyclohexane or an organic thiol.

15. The composition of claim 5 which contains additionally an addition-polymerizable, ethylenically unsaturated compound selected from terminally unsaturated carboxylic ester monomers, a photooxidizable amine selected from a strong acid salt of an aminotriarylmethane leuco dye having the structural formula

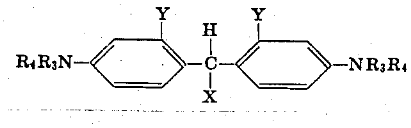

wherein $R_3$ and $R_4$ are each lower alkyl or benzyl, Y and Y' are lower alkyl and X is

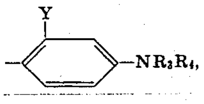

p-methoxyphenyl, 2-thienyl, phenyl, 1-naphthyl, 2,3-dimethoxyphenyl, 3,4-methylenedioxyphenyl, or benzylthiophenyl, and optionally, a chain transfer agent selected from N-phenylglycine, 1,1-dimethyl-3,5-diketocyclohexane or an organic thiol.

16. The composition of claim 11 which contains additionally, pentaerythritol triacrylate.

17. Process of photoactivating the composition of claim 2 which comprises irradiating the composition with light having wavelengths within the range of the absorption bands of the ketone.

18. Process for imaging which comprises irradiating the composition of claim 7 with a color-forming dosage of light having wavelengths within the range of the absorption bands of the ketone.

19. Process for polymerization which comprises irradiating the composition of claim 12 with light having wavelengths within the range of the absorption bands of the ketone.

20. Process for imaging and polymerization which comprises irradiating the composition of claim 15 with light having a wavelength within the range of the absorption bands of the ketone, and an intensity sufficient to simultaneously produce a colored polymerized composition.

21. The composition of claim 1 coated on a plastic film.

22. The composition of claim 7 coated on a plastic film.

23. The composition of claim 10 coated on a plastic film.
24. The composition of claim 12 coated on a plastic film.
25. The composition of claim 15 coated on a plastic film.
26. The composition of claim 1 coated on paper.
27. The composition of claim 7 coated on paper.
28. The composition of claim 10 coated on paper.
29. The composition of claim 12 coated on paper.
30. The composition of claim 15 coated on paper.
31. A composition comprising the composition of claim 1 and an inert solvent.
32. A composition comprising the composition of claim 7 and an inert solvent.
33. A composition comprising the composition of claim 10 and an inert solvent.
34. A composition comprising the composition of claim 12 and an inert solvent.
35. A composition comprising the composition of claim 15 and an inert solvent.
36. The composition of claim 15 wherein the optional chain transfer agent is present as 2-mercaptobenzoxazole.

* * * * *